United States Patent [19]

Knoppel et al.

[11] Patent Number: 5,013,104
[45] Date of Patent: May 7, 1991

[54] CONTROL CONSOLE COMPRISING PEDESTAL, CONSOLE PART AND TOP

[75] Inventors: Hans-Martin Knoppel, Giessen; Oskar Elm, Dietzholztal; Udo Munch, Sinn, all of Fed. Rep. of Germany

[73] Assignee: Rittal-Werk Rudolf Loh GmbH & Co. KG, Fed. Rep. of Germany

[21] Appl. No.: 506,458

[22] Filed: Apr. 9, 1990

[30] Foreign Application Priority Data

Apr. 8, 1989 [DE] Fed. Rep. of Germany ... 8904421[U]

[51] Int. Cl.⁵ .............................................. A47B 91/00
[52] U.S. Cl. .................................. 312/254; 312/328; D14/103
[58] Field of Search ............... 312/254, 287, 278, 279; D14/103

[56] References Cited

U.S. PATENT DOCUMENTS

| | | | |
|---|---|---|---|
| 788,164 | 4/1905 | McCaskey | 312/278 X |
| 1,038,974 | 9/1912 | Schulz | 312/254 |
| 1,244,474 | 10/1917 | Cowles | 312/278 X |
| 1,398,161 | 11/1921 | Spinks | 312/287 X |
| 166,043 | 7/1975 | Volkland | 312/287 |
| 4,012,088 | 3/1977 | Platz | 312/278 X |

Primary Examiner—Joseph Falk
Attorney, Agent, or Firm—Thomas W. Speckman; Douglas H. Pauley

[57] ABSTRACT

A control console having a pedestal, console part and top. The front or back of the pedestal can be closed with a door. The console part is positioned on top of the pedestal and extends beyond the front of the pedestal. The top is positioned on the console part. The portion of the console part extending beyond the top can be closed with a hinged lid and the front of the top can be closed with a door or hinged lid. The installation depth of the top is increased by the back of the top being closed by an overhanging cover. The bottom and top of the cover are inclined with respect to each other and the side walls of the cover end flush with the facing vertical side walls of the top.

4 Claims, 2 Drawing Sheets

CONTROL CONSOLE COMPRISING PEDESTAL, CONSOLE PART AND TOP

BACKGROUND OF THE INVENTION

1. Field of the Invention

The invention relates to a control console having a pedestal, console part and top, where the front or back of the pedestal can be closed with doors, the console part is positioned on top of the pedestal and extends beyond the front of the pedestal, the top is positioned on the console part, and the portion of the console part extending beyond the top can be closed with a hinged lid and the front of the top can be closed with a door or hinged lid.

2. Description of the Prior Art

In a control console of this type the installation depth of the top is limited, because a considerable part of the console part extends beyond the front of the console and the front of the top is also recessed with respect to the front of the pedestal. In many cases, the installation depth of the top is insufficient for housing built-ins, such as visual display devices or the like, in the top.

SUMMARY OF THE INVENTION

It is an object of this invention to provide a control console of the type described above, which can simply have a greater installation depth in the area of the top, without changes in the pedestal, the console part or the top.

This object is achieved in accordance with this invention in that the back of the top is covered by an overhanging cover. The top and bottom of the overhanging cover are inclined towards each other and the side walls of the overhanging cover end flush with the facing vertical side walls of the top.

The installation depth is increased in the area of the top with the use of a cover instead of a back wall. The basic structure of the control console is not changed and the control console can still be used with a back wall and a correspondingly smaller installation depth of the top.

If, in accordance with another embodiment the back of the console part is closed with an inclined back wall which begins at the back of the pedestal and extends beyond its back, the inclination of the back of the console part corresponds to the inclination of the facing bottom of the cover, and the back wall of the console part and the facing bottom of the cover transition flush into each other, then the depth of the top can be adapted to the depth of the pedestal, even though the front of the top is recessed in relation to the front of the pedestal. The flush transition of console part and top result in a pleasant visual appearance of the entire console.

The design of the transition from the console part to the top may also allow the console part to protrude with its back beyond the back of the top, and allow the facing bottom of the cover ends in a horizontal end section to compensate for the offset of the back of the console part with respect to the back of the top.

To avoid making the overhang of the back of the control console look bulky, there is an improvement wherein the back of the console part and the inclined area of the facing bottom of the cover are inclined at an angle of 45° to the vertical, and the top of the cover is inclined at an angle of approximately 15° to the horizontal.

The invention is described in detail through one preferred embodiment shown in the drawings.

DESCRIPTION OF A PREFERRED EMBODIMENT

Figure 1:
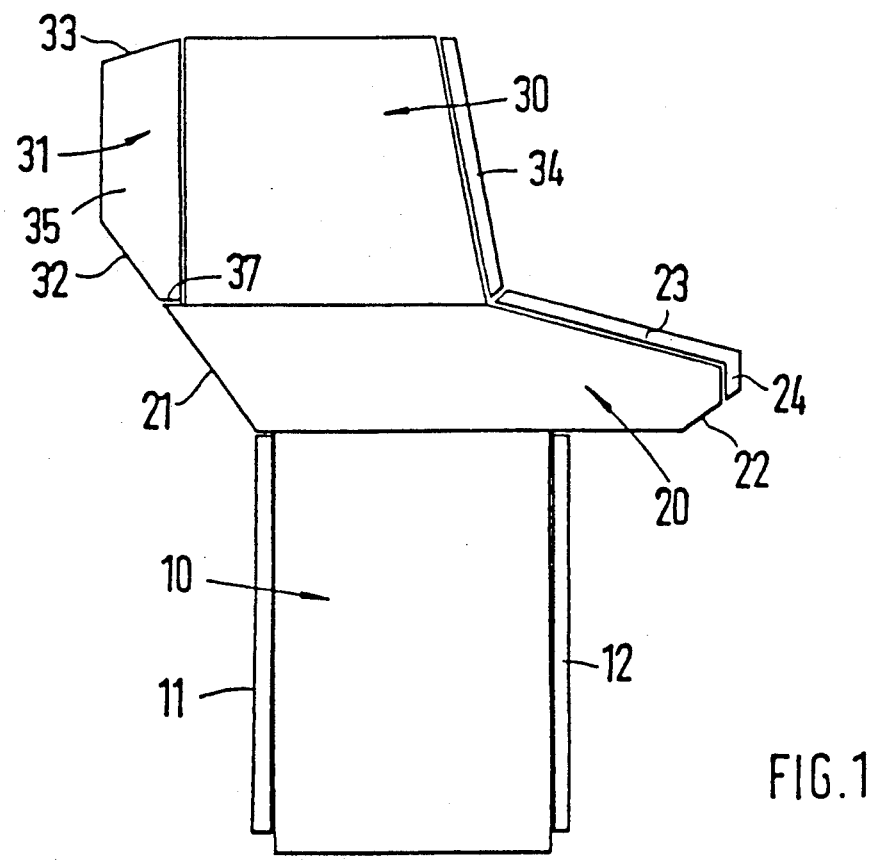
FIG. 1 is a side view of the control console.
Figure 2:
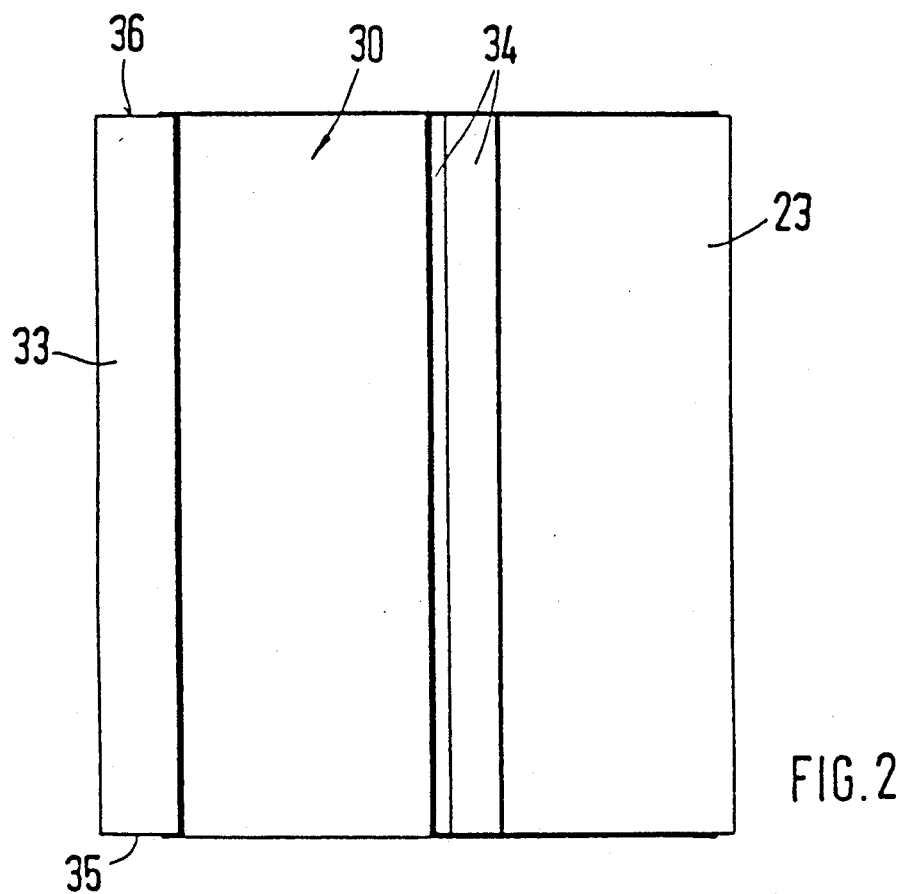
FIG. 2 is a top view of the control console, as shown in FIG. 1.
Figure 3:
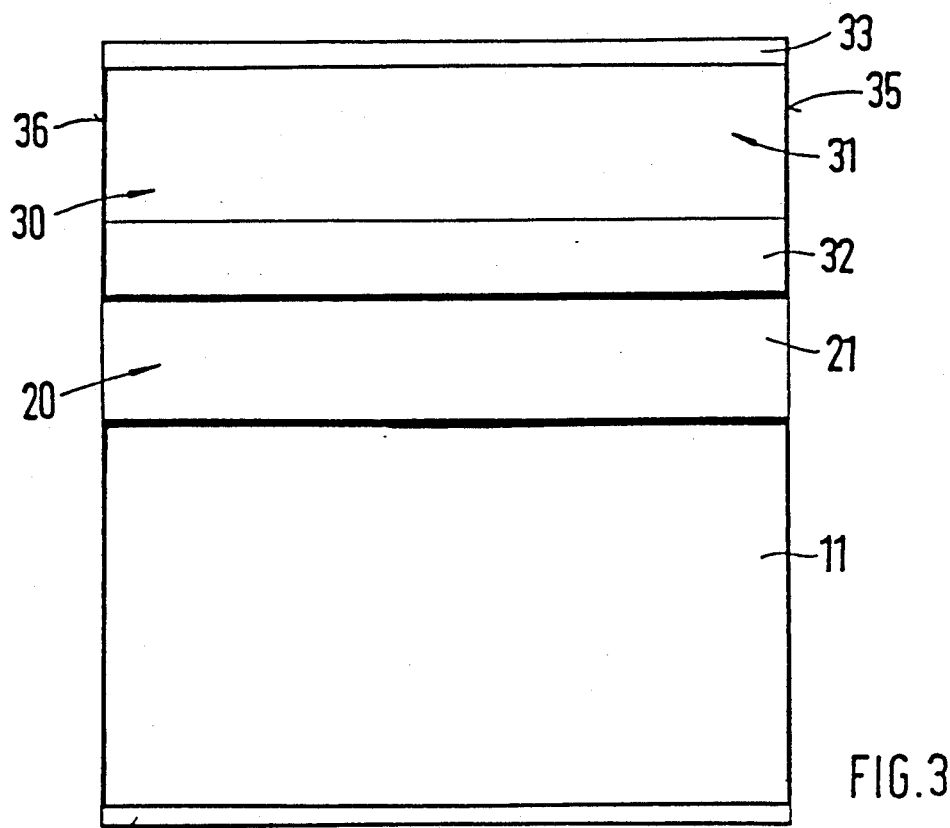
FIG. 3 is a rear view of the control console, as shown in FIG. 1.
Figure 4:
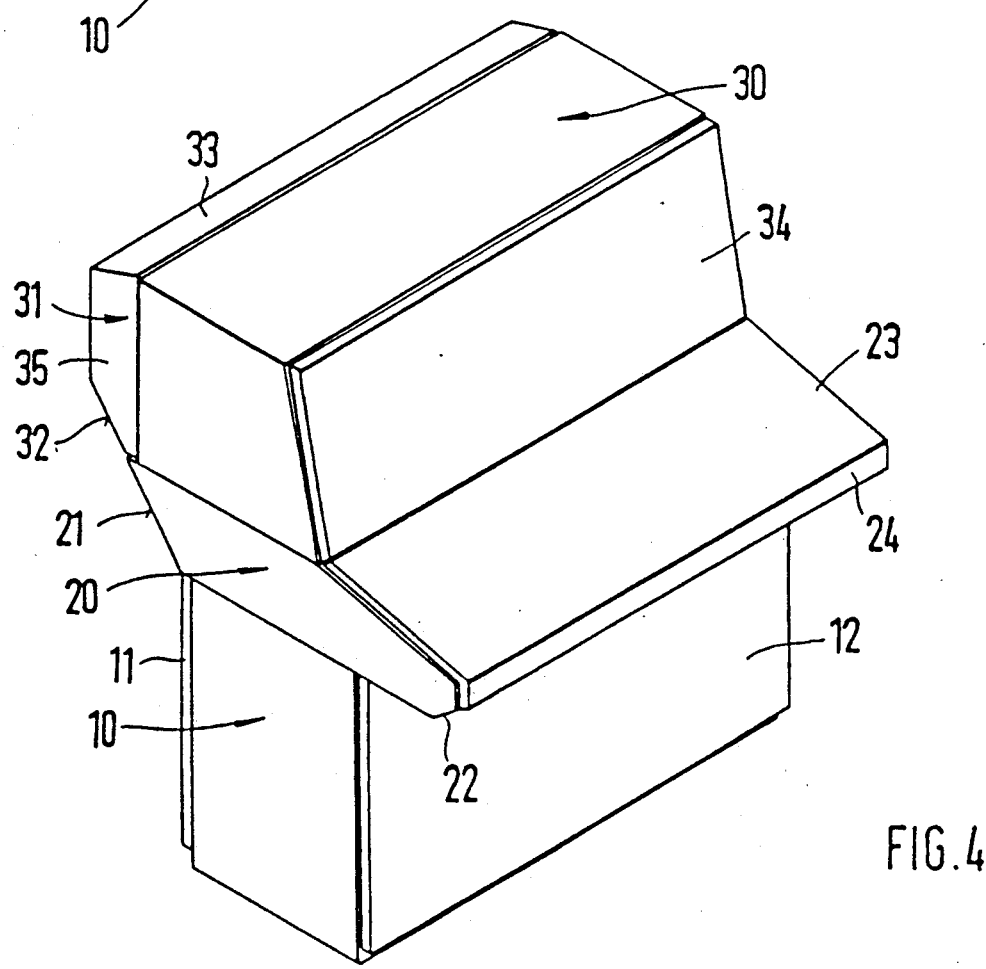
FIG. 4 is a perspective view of the control console, as shown in FIG. 1.

The control console according to this invention comprises, as clearly shown in the views according to FIGS. 1 to 4, pedestal 10, console part 20 and top 30. Pedestal 10 can be closed with hinged doors 11 and 12, respectively at the front and back. Console part 20 is placed on pedestal 10 and extends beyond the front of pedestal 10. Lower front edge 22 of console part 20 is inclined so that operation of or access to console part 20 and top 30, which is placed on console part 20, is made easier. Console part 20 extends beyond the front of top 30 and the front of top 30 is recessed with respect to the front of pedestal 10. Hinged lid 23 with closing and operating edge 24 covers the top of the protruding portion of console part 20. Inclined back 21 of console part 20 begins at the back of pedestal 10 and extends away from it at an angle of approximately 45°.

The front of top 30 is slightly inclined backwards and is closed with a door or hinged lid 34. Inclined back 21 of console part 20 extends beyond the back of top 30, preferably by a distance corresponding to a thickness of a door or an edged back wall. In such embodiment, top 30 can end flush with protruding back 21 of console part 20, but in such embodiment the installation depth of top 30 is fixed by the depth of top 30. Overhanging cover 31 is used to increase the installation depth of top 30. The depth of overhanging cover 31 correspondingly increases the installation depth of top 30. Cover 31 is, with its inclined bottom 32, flush with inclined back 21 of console part 20, and has the same inclination of approximately 45° to the vertical as back 21. The offset between the back of console part 20 and top 30 in the transition area is being compensated by horizontal end section 37 of inclined bottom 32 of cover 31. Top 33 of cover 31 is slightly inclined and is at an angle of approximately 15° to the horizontal, so that the installation space increased by cover 31 is not too severely restricted, and the sharp upper edge is eliminated. Sides 35 and 36 of cover 31 end virtually flush with the facing vertical sides of top 30. Because of the back overhang of console part 20, it is possible to use top 30 with a depth which is equal to or greater than the depth of pedestal 10, even though the front of top 30 is backwardly recessed in relation to the front of pedestal 10.

I claim:

1. In a control console having a pedestal, a console part and a top, at least one of a pedestal front and a pedestal back of said pedestal being closed with a pedestal door, said console part positioned on top of said pedestal and extending beyond said pedestal front, said top disposed on said console part, an extending portion of said console part extending beyond said top being closed with a hinged lid, a top front of said top being closed with a top door, the improvement comprising: an overhanging cover (31) covering a top back of said top (30), a cover top and a cover bottom (32, 33) inclined rearwardly towards each other, and cover side walls (35, 36) of said cover (31) ending flush with facing vertical top side walls of said top (30);

an inclined back wall enclosing a console back of said console part (20) beginning at said pedestal back of said pedestal (10) and extending outward from said pedestal back, said back wall (21) of said console part (20) correspondingly inclined with said cover bottom (32) of said cover (31) and said back wall (21) of said console part (20) and said cover bottom (32) of said cover (31) making a flush transition into each other; and said back wall (21) of said console part (20) extending beyond said top back of said top (30), and a lower section of said cover bottom (32) of said cover (31) terminating in a horizontal end section (37) compensating for an offset of said back wall (21) of said console part (20) with respect to said top back of said top (30).

2. In a control console in accordance with claim 1, wherein said back wall (21) of said console part (20) and said cover bottom (32) of said cover (31) are inclined at an upward angle of approximately 45° to a vertical.

3. In a control console in accordance with claim 2, wherein said cover top (33) of said cover (31) is inclined at a downward angle of approximately 15° to a horizontal.

4. In a control console in accordance with claim 1, wherein said cover top (33) of said cover (31) is inclined at a downward angle of approximately 15° to a horizontal.

* * * * *